(12) United States Patent
Krenz et al.

(10) Patent No.: US 10,975,768 B2
(45) Date of Patent: Apr. 13, 2021

(54) USING AIRCRAFT ELECTRIC ICING PROTECTION SYSTEM FOR ELECTRICAL POWER SYSTEM QUALITY

(71) Applicant: Hamilton Sundstrand Corporation, Charlotte, NC (US)

(72) Inventors: Michael Krenz, Roscoe, IL (US); Galdemir Cezar Botura, Akron, OH (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 234 days.

(21) Appl. No.: 16/105,700

(22) Filed: Aug. 20, 2018

(65) Prior Publication Data
US 2020/0055607 A1 Feb. 20, 2020

(51) Int. Cl.
| | | |
|---|---|---|
| F02C 7/047 | (2006.01) | |
| B64D 15/12 | (2006.01) | |
| H02J 4/00 | (2006.01) | |
| H05B 3/00 | (2006.01) | |
| H02J 1/00 | (2006.01) | |

(52) U.S. Cl.
CPC ............. *F02C 7/047* (2013.01); *B64D 15/12* (2013.01); *H02J 4/00* (2013.01); *H05B 3/0019* (2013.01); *B64D 2221/00* (2013.01); *H02J 1/00* (2013.01)

(58) Field of Classification Search
CPC .... H02J 1/00; H02J 4/00; B64D 15/00; F02C 7/00
See application file for complete search history.

(56) References Cited

U.S. PATENT DOCUMENTS

| | | | |
|---|---|---|---|
| 4,355,239 A | 10/1982 | Williams et al. | |
| 4,678,144 A | 7/1987 | Goehner et al. | |
| 4,814,931 A * | 3/1989 | Kugelman | B64D 15/14 219/483 |
| 4,895,322 A * | 1/1990 | Zieve | B64D 15/163 244/134 D |
| 5,114,103 A | 5/1992 | Coffinberry | |

(Continued)

FOREIGN PATENT DOCUMENTS

| | | |
|---|---|---|
| CN | 85103680 A | 1/1987 |
| CN | 103415975 A | 11/2013 |

(Continued)

OTHER PUBLICATIONS

European Search Report Issued in European Application No. 19191704.6 dated Jan. 29, 2020; 6 Pages.

*Primary Examiner* — Rexford N Barnie
*Assistant Examiner* — Joseph N Inge
(74) *Attorney, Agent, or Firm* — Cantor Colburn LLP

(57) ABSTRACT

A method of preserving power quality on a power grid is provided. The method is implemented by a voltage overflow device that is electrically coupled to the power grid through electrical contacts. A voltage monitoring circuit of the voltage overflow device monitors a voltage via the electrical contacts on the power grid with respect to a predetermined voltage. The voltage monitoring circuit determines whether the voltage exceeds the predetermined voltage. A switch of the voltage overflow device shunt an excess voltage over the predetermined voltage to a resistive load when the voltage exceeds the predetermined voltage to preserve the power quality on the power grid.

15 Claims, 3 Drawing Sheets

(56) References Cited

U.S. PATENT DOCUMENTS

| | | | | |
|---|---|---|---|---|
| 6,237,874 B1* | 5/2001 | Rutherford | ............ | B64D 15/14 |
| | | | | 244/134 D |
| 7,550,866 B2* | 6/2009 | Breit | ........................ | H02J 1/10 |
| | | | | 307/9.1 |
| 8,612,067 B2* | 12/2013 | Leon | ...................... | B64D 15/12 |
| | | | | 701/3 |
| 8,746,622 B2* | 6/2014 | Gallman | ................ | B64D 15/14 |
| | | | | 244/134 D |
| 9,523,594 B1* | 12/2016 | Gordon | ................... | G01P 5/165 |
| 2013/0206902 A1* | 8/2013 | Bader | .................... | B64D 41/00 |
| | | | | 244/110 B |
| 2014/0070054 A1* | 3/2014 | Burton | ................ | H01L 51/0048 |
| | | | | 244/134 D |
| 2015/0292351 A1* | 10/2015 | Pereira | ................... | B64D 15/12 |
| | | | | 219/205 |
| 2016/0359314 A1* | 12/2016 | Rinsurongkawong | ........................ | |
| | | | | H02H 9/042 |
| 2017/0259927 A1* | 9/2017 | Schram | ................ | H02H 1/0007 |
| 2018/0057176 A1* | 3/2018 | Kinlen | ................... | B64D 15/12 |
| 2018/0138716 A1* | 5/2018 | Bailey | ................... | B64D 47/00 |

FOREIGN PATENT DOCUMENTS

| | | |
|---|---|---|
| EP | 3288137 A1 | 2/2018 |
| WO | 2004057174 A1 | 7/2004 |
| WO | 2014074101 A1 | 5/2014 |

* cited by examiner

USING AIRCRAFT ELECTRIC ICING PROTECTION SYSTEM FOR ELECTRICAL POWER SYSTEM QUALITY

BACKGROUND

There are several instances where "excess" power can exist within aircraft electrical power systems. In some cases, a presence of excess power can be intentional, as in the case where batteries are being charged. But, in other cases, the presence of excess power can actually damage equipment through overvoltage type events.

Excess power is serious, and dedicated controls are used to make sure that overvoltage cannot occur or persist. These controls sometimes use "crowbars" to dead short an offending circuit, i.e., sacrificially dumping power into the crowbar. Further, regenerative power, from things like electric actuation systems, has further added to excess power concerns within aircraft electrical power systems, as regenerative power is very erratic and provides undesired voltage rises within these systems.

BRIEF DESCRIPTION

In accordance with one or more embodiments, a method of preserving power quality on a power grid where a voltage overflow device is electrically coupled to the power grid through at least one electrical contact is provided. The method includes monitoring, by a voltage monitoring circuit of the voltage overflow device, a voltage via the at least one electrical contact on the power grid with respect to a predetermined voltage; determining, by the voltage monitoring circuit of the voltage overflow device, whether the voltage exceeds the predetermined voltage; and shunting, by a switch of the voltage overflow device, an excess voltage over the predetermined voltage to a resistive load when the voltage exceeds the predetermined voltage to preserve the power quality on the power grid.

In accordance with one or more embodiments or the method embodiment above, the voltage monitoring circuit can continue to monitor the voltage on the at least one electrical contact on the power grid with respect to the predetermined voltage during the shunting.

In accordance with one or more embodiments or any of the method embodiments above, the voltage monitoring circuit can determine that the voltage is below the predetermined voltage and removes the shunt.

In accordance with one or more embodiments or the method embodiment above, the voltage monitoring circuit can determine that the voltage exceeds the predetermined voltage and maintains the shunt.

In accordance with one or more embodiments or the method embodiment above, the voltage overflow device can include a memory storing the predetermined voltage.

In accordance with one or more embodiments or the method embodiment above, the power grid can include an electrical system of an aircraft.

In accordance with one or more embodiments or the method embodiment above, the resistive load can include an electrical deicing or anti-icing system of an aircraft comprised of electrically resistive elements.

In accordance with one or more embodiments, a voltage overflow device for preserving power quality on a power grid is provided. The voltage overflow device being electrically coupled to the power grid through at least one electrical contact. The voltage overflow device includes a voltage monitoring circuit configured to monitor a voltage via the at least one electrical contact on the power grid with respect to a predetermined voltage and determine when the voltage exceeds the predetermined voltage. The voltage overflow device includes a switch configured to shunt an excess voltage over the predetermined voltage to a resistive load in accordance with the voltage monitoring circuit determining that the voltage exceeds the predetermined voltage to preserve the power quality on the power grid.

In accordance with one or more embodiments or the voltage overflow device embodiment above, the voltage monitoring circuit can continue to monitor the voltage on the at least one electrical contact on the power grid with respect to the predetermined voltage during the shunting.

In accordance with one or more embodiments or any of the voltage overflow device embodiments above, the voltage monitoring circuit can determine that the voltage is below the predetermined voltage and removes the shunt.

In accordance with one or more embodiments or the voltage overflow device embodiment above, the voltage monitoring circuit can determine that the voltage exceeds the predetermined voltage and maintains the shunt.

In accordance with one or more embodiments or the voltage overflow device embodiment above, the voltage overflow device can include a memory storing the predetermined voltage.

In accordance with one or more embodiments or the voltage overflow device embodiment above, the power grid can include an electrical system of an aircraft.

In accordance with one or more embodiments or the voltage overflow device embodiment above, the resistive load can include an electrical deicing or anti-icing system of an aircraft comprised of electrically resistive elements.

In accordance with one or more embodiments, a system for preserving power quality on a power grid is provided. The system includes a power grid; a resistive load; and a voltage overflow device. The voltage overflow device being electrically coupled to the power grid through at least one electrical contact. The voltage overflow device including a voltage monitoring circuit configured to monitor a voltage via the at least one electrical contact on the power grid with respect to a predetermined voltage and determine when the voltage exceeds the predetermined voltage. The voltage overflow device including a switch configured to shunt an excess voltage over the predetermined voltage to the resistive load in accordance with the voltage monitoring circuit determining that the voltage exceeds the predetermined voltage to preserve the power quality on the power grid.

In accordance with one or more embodiments or the system embodiment above, the voltage monitoring circuit can continue to monitor the voltage on the at least one electrical contact on the power grid with respect to the predetermined voltage during the shunting.

In accordance with one or more embodiments or any of the system embodiments above, the voltage monitoring circuit can determine that the voltage is below the predetermined voltage and removes the shunt.

In accordance with one or more embodiments or the voltage overflow device embodiment above, the voltage monitoring circuit can determine that the voltage exceeds the predetermined voltage and maintains the shunt.

In accordance with one or more embodiments or the system embodiment above, the voltage overflow device can include a memory storing the predetermined voltage.

In accordance with one or more embodiments or the system embodiment above, the power grid can include an electrical system of an aircraft.

In accordance with one or more embodiments or the system embodiment above, the resistive load can include an electrical deicing or anti-icing system of an aircraft comprised of electrically resistive elements.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
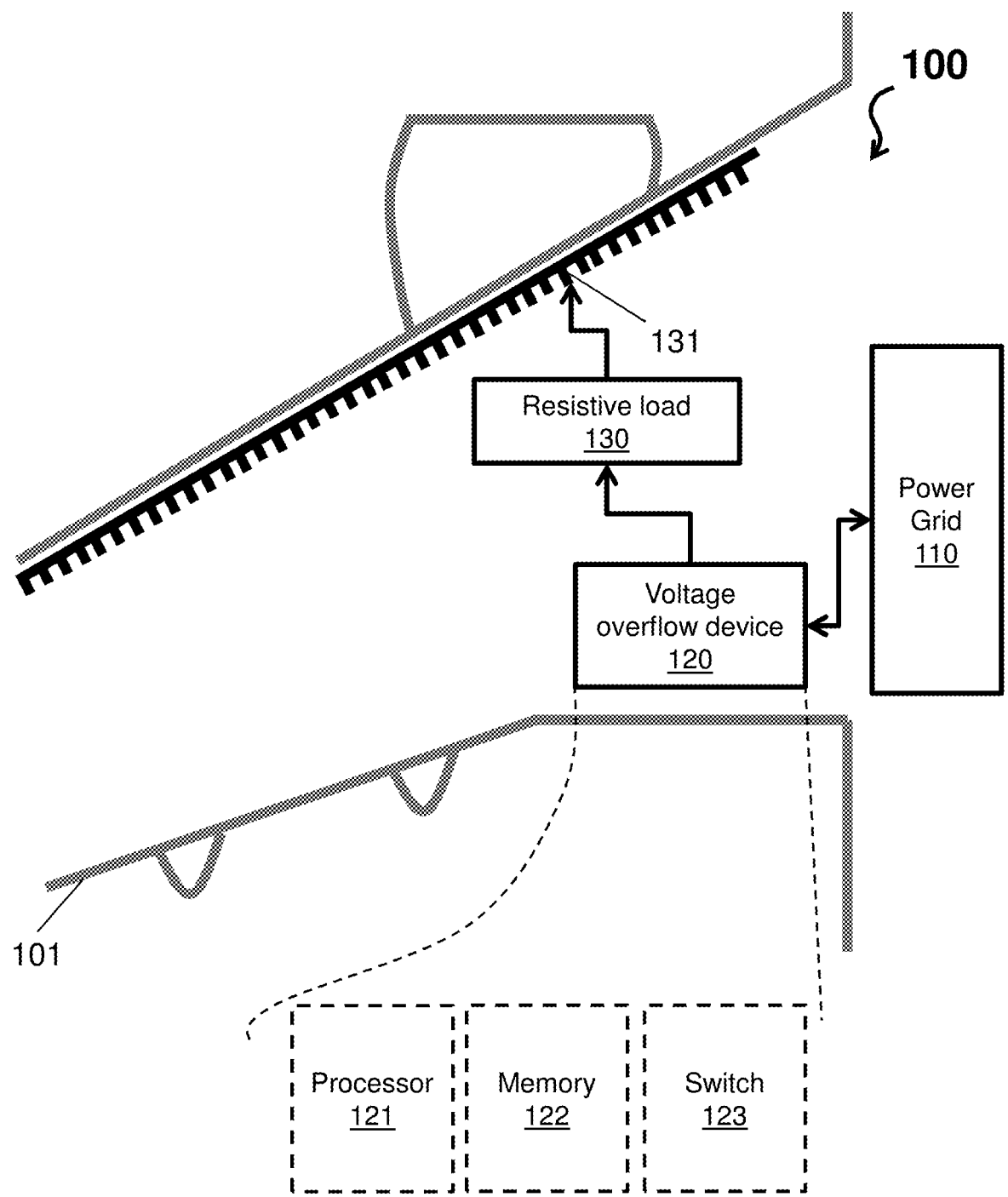
FIG. 1 depicts a system for preserving power quality in accordance with one or more embodiments.

FIG. 1 depicts a system 100 for preserving power quality in accordance with one or more embodiments. The system 100 can be implemented on an aircraft 101, such as an airplane or helicopter, but also a boat or other vehicle. For ease of explanation, the system is described with respect to the aircraft 101. The system 100 includes a power grid 110 and a voltage overflow device 120, which can further include a processor 121, a memory 122, and a switch 123. The system 100 also includes a resistive load 130, which by way of example can include an electrical deicing or anti-icing system 131 of an aircraft comprised of electrically resistive elements.

In general, the system 100 implements a way of preserving a power quality on "an island of power," (e.g., on the power grid 110 of the aircraft 101) by utilizing the resistive load 130. That is, instead of shorting out a given point in the power grid 110 to arrest an overvoltage, the system 100 closes the switch 123 to route the overvoltage to the resistive load 130, thereby dumping the excess power on the grid 110 into the resistive load 130.

Technical effects and benefits of embodiments herein include usage of onboard equipment (e.g., the electrical deicing or anti-icing system) to allow removal of dedicated overvoltage protection units, while providing an efficient use of excess power. These technical effects and benefits are necessarily rooted in the voltage overflow device 120, and the processor therein 121, to overcome problems arising in conventional aircraft electrical power systems. In this regard, leveraging the electrical deicing or anti-icing system 131 to solve a problem associated with the conventional aircraft electrical power systems also saves weight of redundant solutions, such as crowbar overvoltage protection units, and provides useful work for energy captured on the power grid 110 (e.g. regenerative power from actuators).

The power grid 110 is an interconnected electric cabling network for delivering electricity from producers (e.g., a jet engine, auxiliary power unit, batteries, solar panels, fuel cells, ultracapacitors) to consumers (e.g., lights, actuators, fans, flight sensors, communication systems). In the above example, the power grid 110 runs throughout the aircraft 101.

The voltage overflow device 120 is an electric mechanism or computer that when a predetermined voltage is exceeded, shunts all undesired power to the resistive load 130. The voltage overflow device 120 can comprise any number of circuits and/or components to shunt the excess power or over voltage. The voltage overflow device 120 is electrically coupled to the power grid through at least one electrical contact and is electrically coupled to the resistive load 130 (and the electrical deicing or anti-icing system 131).

In accordance with one or more embodiments, the voltage overflow device 120 can be any computing device with one or more central processing units (referred to as the processor 121). The processor 121 is coupled via a system bus to the memory 122, the switch 123, and various other components. The memory 122 can include a read only memory (ROM) and a random access memory (RAM). The memory 122 is an example of a tangible storage medium readable by the processor 121, where the software is stored on the memory 122 as instructions for execution to cause the voltage overflow device 120 to operate, such as is described herein with reference to FIGS. 2-3. The switch 123 is an electrical component that can "make" or "break" an electrical circuit, by interrupting the current or diverting it from one point (at least one electrical contact on the power grid 110) to another point (the resistive load 130). For example, the voltage overflow device 120 can be and/or include a field programmable gate array, a microcontroller, or other integrated circuit (e.g., a voltage monitoring circuit) with a programmable threshold (e.g., a predetermined voltage) stored therein.

Figure 2:
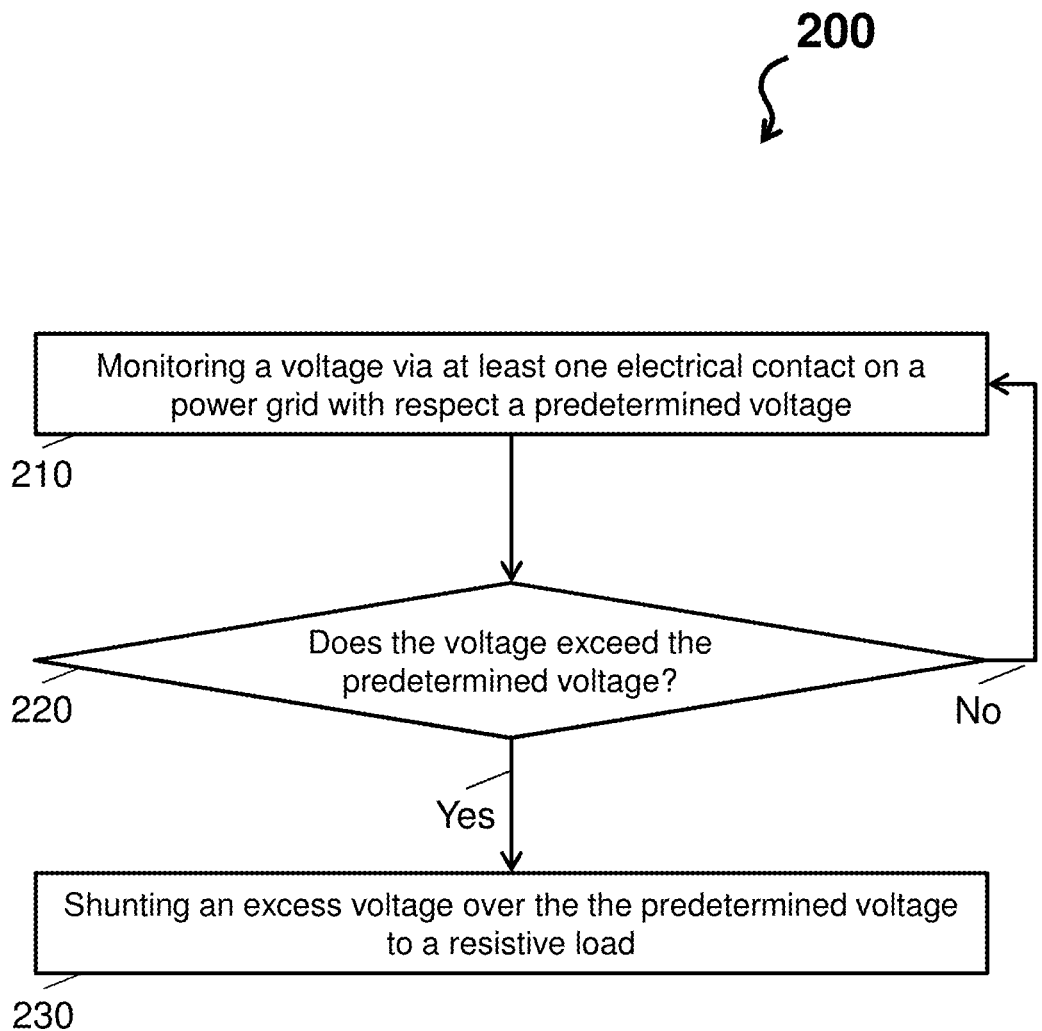
FIG. 2 depicts a process flow of a system for preserving power quality in accordance with one or more embodiments.
Figure 3:
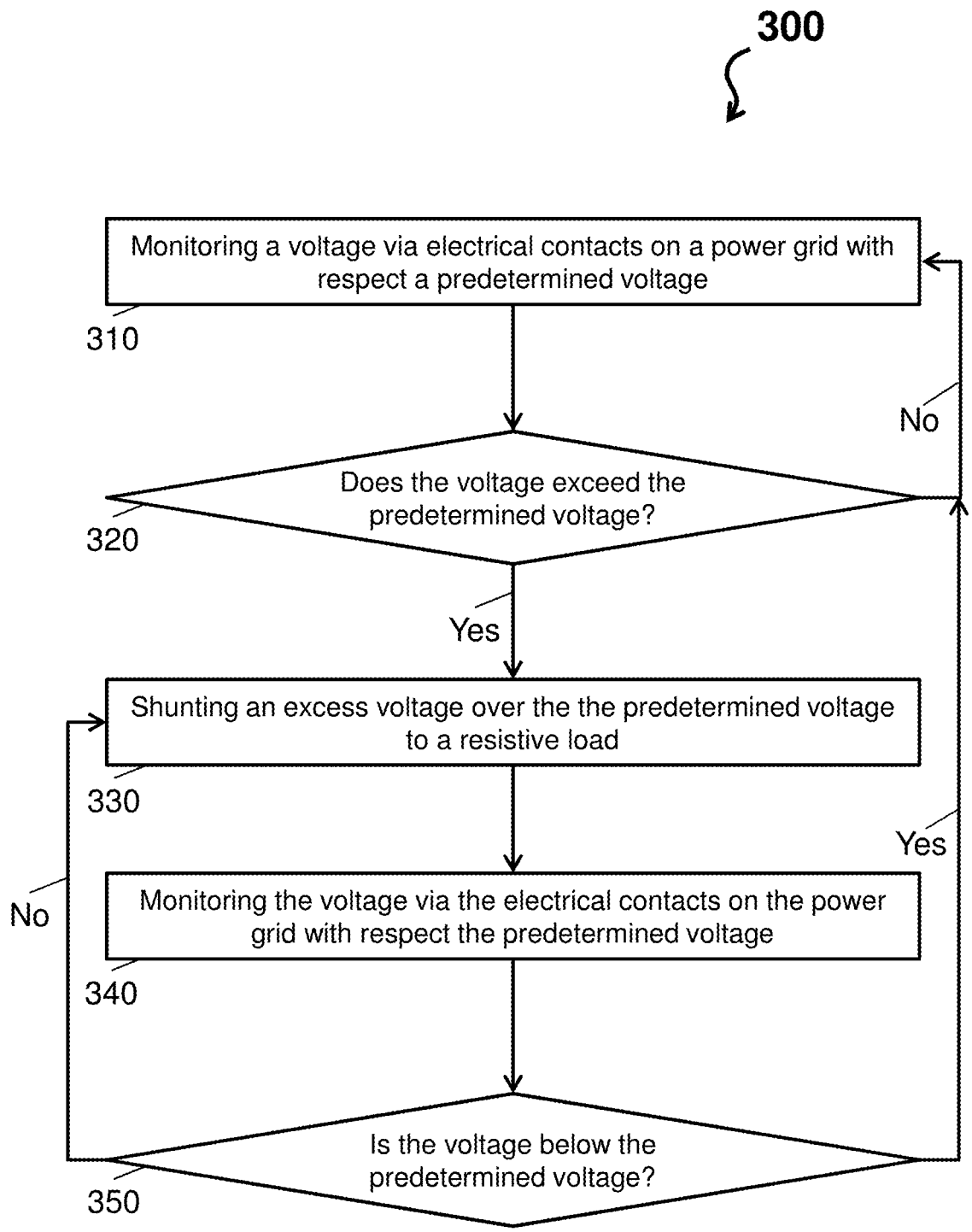
FIG. 3 depicts a process flow of a system for preserving power quality in accordance with one or more embodiments.

In accordance with one or more embodiments, when the power grid 110 is a DC system, the voltage overflow device 120 can include a Zener diode (sized accordingly) with a breakdown voltage (e.g., a predetermined voltage) equivalent to a maximum desired voltage on a point of the power grid 110 to which the Zener diode is connected (such that the voltage overflow device 120 described herein operates with reference to FIGS. 2-3). When conducting, the Zener diode provides a current by turning on the switch 123 that connects, via electrical contacts, the point of the power grid 110 to the electrical deicing or anti-icing system 131 acting as a load bank to accept the excess energy.

The resistive load 130 is any system, device or component that converts current with respect to excess voltage on the power grid 110 to other forms of energy. The resistive load 130 can include, in addition to or in lieu of the electrical deicing or anti-icing system 131, any substantial load on the aircraft 101 capable of handling the excess voltage. The electrical deicing or anti-icing system 131 includes electrical anti/de-icing pads, blankets, heaters, etc.

FIG. 2 depicts a process flow 200 of the system 100 for preserving power quality in accordance with one or more embodiments. For example, the process flow 200 is a method implemented by the voltage overflow device 120 to preserve the power quality on the power grid 100.

The process flow 200 begins at block 210, where a voltage monitoring circuit of the voltage overflow device 120 monitors a voltage via the at least one electrical contact on the power grid 100 with respect to a predetermined voltage. For instance, the predetermined voltage can be 270 volts.

At decision block 220, the voltage monitoring circuit determines whether the voltage exceeds the predetermined voltage. If the voltage does not exceed the predetermined voltage, the process flow 200 returns to block 210 (as shown by the No arrow). If the voltage exceeds the predetermined voltage, the process flow 200 proceeds to block 230 (as shown by the yes arrow). Continuing with the above example, if the voltage on the power grid 110 goes to 300 volts, the voltage monitoring circuit would detect this overload with respect to the 270 predetermined voltage.

At block 230, the switch 123 shunts an excess voltage over the predetermined voltage to the resistive load 130 (i.e., when the voltage exceeds the predetermined voltage) to preserve the power quality on the power grid 100. For example, any excess power over 270 volts is directed to the electrical deicing or anti-icing system 131.

FIG. 3 depicts a process flow 300 of the system 100 for preserving power quality in accordance with one or more embodiments. For example, the process flow 300 is a method implemented by the voltage overflow device 120 to preserve the power quality on the power grid 100. The process flow 300 begins at block 310, where a voltage monitoring circuit of the voltage overflow device 120 monitors a voltage via electrical contacts on the power grid 100 with respect to a predetermined voltage. For instance, the predetermined voltage can be 270 volts.

At decision block 320, the voltage monitoring circuit determines whether the voltage exceeds the predetermined voltage. If the voltage does not exceed the predetermined voltage, the process flow 300 returns to block 310 (as shown by the No arrow). If the voltage exceeds the predetermined voltage, the process flow 300 proceeds to block 330 (as shown by the Yes arrow). Continuing with the above example, if the voltage on the power grid 110 goes to 300 volts, the voltage monitoring circuit would detect this overload with respect to the 270 predetermined voltage.

At block 330, the switch 123 shunts an excess voltage over the predetermined voltage to the resistive load 130 (i.e., when the voltage exceeds the predetermined voltage) to preserve the power quality on the power grid 100. For example, any excess power over 270 volts is directed to the electrical deicing or anti-icing system 131.

At block 340, the voltage monitoring circuit continues to monitor the voltage via the electrical contacts on the power grid 100 with respect to the predetermined voltage during the shunting.

At decision block 350, the voltage monitoring circuit determines whether the voltage is below the predetermined voltage. If the voltage is not below the predetermined voltage, the process flow 300 returns to block 330 (as shown by the No arrow). In turn, the voltage monitoring circuit maintains the shunt. If the voltage is below the predetermined voltage, the process flow 300 returns to block 310 (as shown by the Yes arrow). Continuing with the above example, if the voltage on the power grid 110 goes to 300 volts, the voltage monitoring circuit would detect this overload with respect to the 270 predetermined voltage.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of preserving power quality on a power grid where a voltage overflow device is electrically coupled to the power grid through at least one electrical contact, the method comprising:
monitoring, by a voltage monitoring circuit of the voltage overflow device, a voltage via the at least one electrical contact on the power grid of an aircraft with respect to a predetermined voltage;
determining, by the voltage monitoring circuit of the voltage overflow device, whether the voltage exceeds the predetermined voltage; and
shunting, by a switch of the voltage overflow device, an excess voltage over the predetermined voltage to an electrical deicing or anti-icing system of the aircraft including electrically resistive elements when the voltage exceeds the predetermined voltage to preserve the power quality on the power grid.

2. The method of claim 1, wherein the voltage monitoring circuit continues to monitor the voltage on the at least one electrical contact on the power grid with respect to the predetermined voltage during the shunting.

3. The method of claim 2, wherein the voltage monitoring circuit determines that the voltage is below the predetermined voltage and removes the shunt.

4. The method of claim 2, wherein the voltage monitoring circuit determines that the voltage exceeds the predetermined voltage and maintains the shunt.

5. The method of claim 1, wherein the voltage overflow device comprises a memory storing the predetermined voltage.

6. A voltage overflow device for preserving power quality on a power grid, the voltage overflow device being electrically coupled to the power grid through at least one electrical contact, the voltage overflow device comprising:
a voltage monitoring circuit configured to monitor a voltage via the at least one electrical contact on the power grid of an aircraft with respect to a predetermined voltage and determine when the voltage exceeds the predetermined voltage; and
a switch configured to shunt an excess voltage over the predetermined voltage to an electrical deicing or anti-icing system of the aircraft including electrically resistive elements in accordance with the voltage monitoring circuit determining that the voltage exceeds the predetermined voltage to preserve the power quality on the power grid.

7. The voltage overflow device of claim 6, wherein the voltage monitoring circuit continues to monitor the voltage on the at least one contact on the power grid with respect to the predetermined voltage during the shunting.

8. The voltage overflow device of claim 7, wherein the voltage monitoring circuit determines that the voltage is below the predetermined voltage and removes the shunt.

9. The voltage overflow device of claim 7, wherein the voltage monitoring circuit determines that the voltage exceeds the predetermined voltage and maintains the shunt.

10. The voltage overflow device of claim 6, wherein the voltage overflow device comprises a memory storing the predetermined voltage.

11. A system for preserving power quality on a power grid, the system comprising:
   a power grid of an aircraft;
   an electrical deicing or anti-icing system of the aircraft including electrically resistive elements; and
   a voltage overflow device being electrically coupled to the power grid through at least one electrical contact, the voltage overflow device comprising:
      a voltage monitoring circuit configured to monitor a voltage via the at least one electrical contact on the power grid with respect to a predetermined voltage and determine when the voltage exceeds the predetermined voltage, and
      a switch configured to shunt an excess voltage over the predetermined voltage to the electrical deicing or anti-icing system in accordance with the voltage monitoring circuit determining that the voltage exceeds the predetermined voltage to preserve the power quality on the power grid.

12. The system of claim 11, wherein the voltage monitoring circuit continues to monitor the voltage on the at least one electrical contact on the power grid with respect to the predetermined voltage during the shunting.

13. The system of claim 12, wherein the voltage monitoring circuit determines that the voltage is below the predetermined voltage and removes the shunt.

14. The system of claim 12, wherein the voltage monitoring circuit determines that the voltage exceeds the predetermined voltage and maintains the shunt.

15. The system of claim 12, wherein the voltage overflow device comprises a memory storing the predetermined voltage.

* * * * *